(12) United States Patent
Davidson et al.

(10) Patent No.: US 7,883,276 B2
(45) Date of Patent: Feb. 8, 2011

(54) OPTICAL TRANSMISSION COUPLING

(75) Inventors: Daniel Davidson, Seattle, WA (US);
Joseph E. Skidmore, Mountlake Terrace, WA (US); Richard A. Fine, Mercer Island, WA (US)

(73) Assignee: SonoSite, Inc., Bothell, WA (US)

( * ) Notice: Subject to any disclaimer, the term of this patent is extended or adjusted under 35 U.S.C. 154(b) by 142 days.

(21) Appl. No.: 12/251,204

(22) Filed: Oct. 14, 2008

(65) Prior Publication Data

US 2010/0092131 A1 Apr. 15, 2010

(51) Int. Cl.
*G02B 6/38* (2006.01)
*G02B 6/36* (2006.01)

(52) U.S. Cl. .............................. 385/58; 385/53; 385/55; 385/60; 385/70

(58) Field of Classification Search ........................ None
See application file for complete search history.

(56) References Cited

U.S. PATENT DOCUMENTS

| | | | |
|---|---|---|---|
| 4,738,506 A | 4/1988 | Abendschein et al. |
| 5,329,604 A | 7/1994 | Baldwin et al. |
| 5,525,068 A | 6/1996 | Graham et al. |
| 5,548,925 A | 8/1996 | Marocco et al. |
| 5,716,224 A | 2/1998 | Masuda et al. |
| 6,179,479 B1 | 1/2001 | Crivelli et al. |
| 6,298,917 B1 | 10/2001 | Kobylinski et al. |
| 6,340,246 B1 | 1/2002 | Yoshida et al. |
| D454,840 S | 3/2002 | Ohbayashi et al. |
| 6,368,123 B2 | 4/2002 | Uchiyama et al. |
| D458,903 S | 6/2002 | Ohbayashi et al. |
| 6,520,782 B2 | 2/2003 | Mori et al. |
| 6,572,274 B1 | 6/2003 | Margaliot et al. |
| D476,624 S | 7/2003 | Watanabe et al. |
| D476,625 S | 7/2003 | Watanabe et al. |
| D476,626 S | 7/2003 | Watanabe et al. |
| 6,733,311 B2 | 5/2004 | Kameda et al. |
| 6,811,318 B1 | 11/2004 | Hollis et al. |
| 6,832,923 B2 | 12/2004 | Sasame et al. |
| 6,845,210 B2 | 1/2005 | Ohbayashi et al. |
| 6,866,424 B2 | 3/2005 | Tanaka et al. |
| 6,877,999 B2 | 4/2005 | Hashimoto et al. |
| 6,887,087 B2 | 5/2005 | Lai et al. |
| 6,896,530 B2 | 5/2005 | Nishio et al. |
| 6,908,319 B2 | 6/2005 | Sasame et al. |
| 6,942,503 B2 | 9/2005 | Yamaguchi et al. |
| 6,955,546 B1 | 10/2005 | Huang et al. |
| 6,971,891 B1 | 12/2005 | Huang et al. |
| 6,984,075 B2 | 1/2006 | Satoh et al. |

(Continued)

OTHER PUBLICATIONS

International Search Report and Written Opinion issued for PCT/US09/60418 dated Dec. 23, 2009, 8 pgs.

*Primary Examiner*—Rhonda S Peace
(74) *Attorney, Agent, or Firm*—Fulbright & Jaworski L.L.P.

(57) ABSTRACT

The present invention is directed to systems and methods that couple together optical devices in a manner that prevents damaging light from escaping the coupling except through the devices. In order to prevent damaging light from coming into contact with the user, the present invention obscures the source optical device by using at least one moveable gate to prevent damaging light from being transmitted outside of the coupling until such time as the target optical device is fully inserted into the coupling, thereby preventing light that could potentially damage a person from escaping the system except through the optical device.

24 Claims, 10 Drawing Sheets

U.S. PATENT DOCUMENTS

| | | |
|---|---|---|
| 7,025,609 B2 | 4/2006 | Matsumoto et al. |
| 7,086,878 B2 | 8/2006 | Mine et al. |
| 7,101,202 B2 | 9/2006 | Fan et al. |
| D530,672 S | 10/2006 | Mine et al. |
| 7,134,888 B2 | 11/2006 | Fan et al. |
| 7,140,892 B2 | 11/2006 | Takeuchi et al. |
| 7,144,163 B2 | 12/2006 | Tanaka et al. |
| 7,153,041 B2 | 12/2006 | Mine et al. |
| D537,037 S | 2/2007 | Takehara et al. |
| D539,741 S | 4/2007 | Takehara et al. |
| 7,300,292 B2 | 11/2007 | Nagata et al. |
| 7,309,259 B2 | 12/2007 | Sun et al. |
| 7,500,791 B2 * | 3/2009 | Frith .......................... 385/88 |
| 7,607,839 B2 * | 10/2009 | Frith .......................... 385/88 |
| 2001/0033267 A1 | 10/2001 | Kim et al. |
| 2002/0068852 A1 | 6/2002 | Coakley et al. |
| 2003/0191379 A1 | 10/2003 | Benaron et al. |
| 2005/0187509 A1 | 8/2005 | Wolf |
| 2006/0157637 A1 | 7/2006 | Karasawa et al. |
| 2007/0175999 A1 | 8/2007 | Tsikos et al. |
| 2007/0273937 A1 | 11/2007 | Oguchi |
| 2008/0045822 A1 | 2/2008 | Phillips et al. |

* cited by examiner

OPTICAL TRANSMISSION COUPLING

TECHNICAL FIELD

The present invention relates generally to an optical transmission coupling and more particularly to an optical transmission coupling that substantially prevents harmful light from the optical source from prematurely escaping the coupling before the target optical transmission connector is inserted into the coupling.

BACKGROUND OF THE INVENTION

The use of optical devices in various applications has brought about a need for the capability of coupling optical devices together in situations where the applicable light source from the incoming optical device is already energized, creating a risk that damaging light will endanger those exposed to it. For example, various systems and devices used for medical purposes incorporate the use of an optical source (for example, a laser) for a variety of applications, including utilizing light to visually determine the location of certain medical devices as they travel through a patient's body. The optical source can be something in the visible spectrum (i.e., can be seen with the naked eye) or something in the non-visable spectrum that may require the use of additional apparatus to view the light source at issue.

An example of one application of this technology incorporates a catheter stylet with an optical fiber that allows the medical provider to correctly position the catheter within the patient. Other applications include the use of fiber optic technology to facilitate the medical use of laser catheters to ablate lesions or perform angioplasty. As the technology develops, it is expected that the use of optical devices in conjunction with various light sources will greatly increase in the medical industry.

However, various light sources used in such applications (e.g., light emitting diodes, lasers, etc.) can be harmful to those who may be exposed to the light eminating from the source. Damaging light can be produced from a variety of sources and can injure a person, such as causing damage to eyesight (e.g., retina, lens). For example, the coherence and low divergence of laser light means that it can be focused by the eye into an extremely small spot on the retina, quickly (sometimes in less than one second) resulting in localized burning and permanent damage.

Various standards apply to the safety of laser products emitting laser radiation and have led to the adoption of safety designations. Lasers have been classified according to the degree of optical radiation hazard in order to aid hazard evaluation and to adequately develop user safety control measures. Lasers are usually labeled with a safety class number that identifies how dangerous the laser is. Class I lasers are inherently safe as the light is either low power or very diffuse. Class II lasers are considered safe during normal use as the blink reflex of the eye will generally prevent damage. Lasers of Class III and above present increasing levels of risk for significant damage of both eyes and skin.

People working with Class III and above can protect their eyes with safety goggles that are designed to absorb light of a particular wavelength. Such precautions and perhaps other protective gear would normally be required in systems where optical connectors are coupled to other connectors outside of an enclosure. In certain medical applications, for example, one optical device provides the light source of the system, while the second optical device connector is a disposable component of the system that is changed out and discarded after each use cycle of the system (e.g., catheter stylets with optical fibers).

Regulations or product guidelines may explicitly require that the light source transmitted from the source optical device be turned off when the disposable component of the system is changed out for lasers classified as Class III or above. Alternatively, protective gear may be required for any system operator or other person whose eyesight could potentially be exposed to the damaging light. However, the danger that system operators will not power down the light source when appropriate or fail to use suitable protective gear (or fail to use it properly) in the operation of the system is high. Also, problems could exist where the coupling between the light source and the target connector fails (sometimes because of a failure to properly interlock the connectors, and sometimes because of mechanical failure). Such a failure could result in damage to operators and patients.

BRIEF SUMMARY OF THE INVENTION

The present invention is directed to systems and methods that couple together optical devices in a manner that prevents damaging light from escaping the coupling except through the devices. In order to prevent damaging light from coming into contact with the user, the present invention obscures the source optical device by using at least one moveable gate to prevent damaging light from being transmitted outside of the coupling until such time as the target optical device is fully inserted into the coupling, thereby preventing light that could potentially damage a person from escaping the system except through the optical device.

In order to prevent light from being inappropriately transmitted from the source device, the coupling may utilize any number of embodiments to insure that damaging light is only transmitted beyond the coupling through a proper optical device. Such embodiments incorporate one or more gate shutters that effectively close the light canal of the coupling when the coupling is in its natural condition (i.e., when no optical device is attached to the source optical device. Various embodiments of the invention utilize complimentary redundant components that each act to prevent damaging light from being transmitted outside of the coupling. This redundancy ensures that there is no single point of failure that could result in a complete failure of the coupling.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
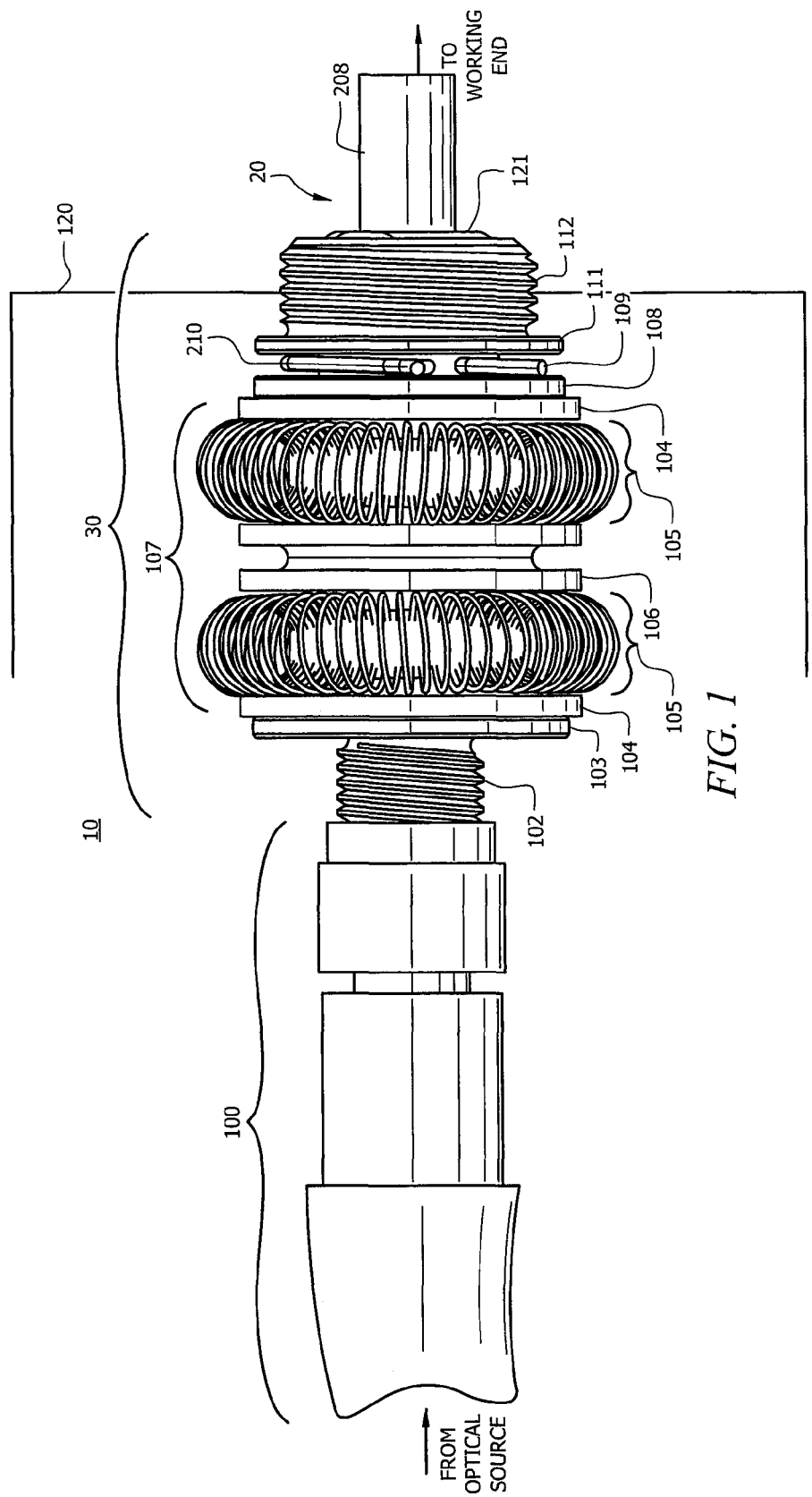
FIG. 1 is a side view of an embodiment of the present invention that utilizes a split shutter design to prevent damaging light from being transmitted outside of the coupling body.

Referring to the embodiment of the invention shown in FIG. 1, optimal transmission arrives from an optical source, not shown. The optical source, which can be any type of optical source, such as laser, LED, laser diode, bulb, arclights, etc., is connected to optical device 100, which can be any type of connector, such as a SMA905 fiber optic connector (Amphenol Subminiature version A) or an FC/APC (with or without threads). Various types of light sources may be used depending on the application. A laser (light amplified stimulated emission of radiation) is a device that emits electromagnetic radiation of any frequency (e.g., infrared, ultraviolet, X-ray, radio, microwave, etc.) and is often used as the light source. Optical device 100, in this embodiment, connects to coupling 30 via threads 102 of coupling 30 and internal threads (not shown) at the end of optical device 100. Any coupling type can be used to connect optical device 100 to coupling 30.

Upstream flange 103 and downstream flange 108 function as the external barriers that provide the seat for shutter 107. Shutter (or gate) 107 is split into twin sections, each held in place on coupling 30 by garter springs 105. Garters 105 are themselves seated between outside shutter flange 104 and inside shutter flange 106. Adjacent to flange 108 is slot 210 into which retention clip 109 is positioned to lock ferrule 208 into place once it is properly positioned into coupling 30. Clip 109, as will be seen, provides a positive latch mechanism so that the user will have a positive tactile sense when downstream connector 20 is inserted into distal end 121 of coupling 30. This positive latch will prevent inadvertent improper positioning of optical device connector 20 with respect to optical device 100. Threads 112 are used in one embodiment to mount coupling 30 to a device panel, such as to panel 120, with the coupling being contained within an enclosure with only end 121 visible to the user. A threaded nut (not shown) can be used to secure coupling 30 to panel 120. Note that while two gates are shown in the embodiment, any number and configuration of gates can be used to achieve positive closure of the transmission path within coupling 30 prior to the full withdrawal of connector 20 from coupling 30.

Figure 2:
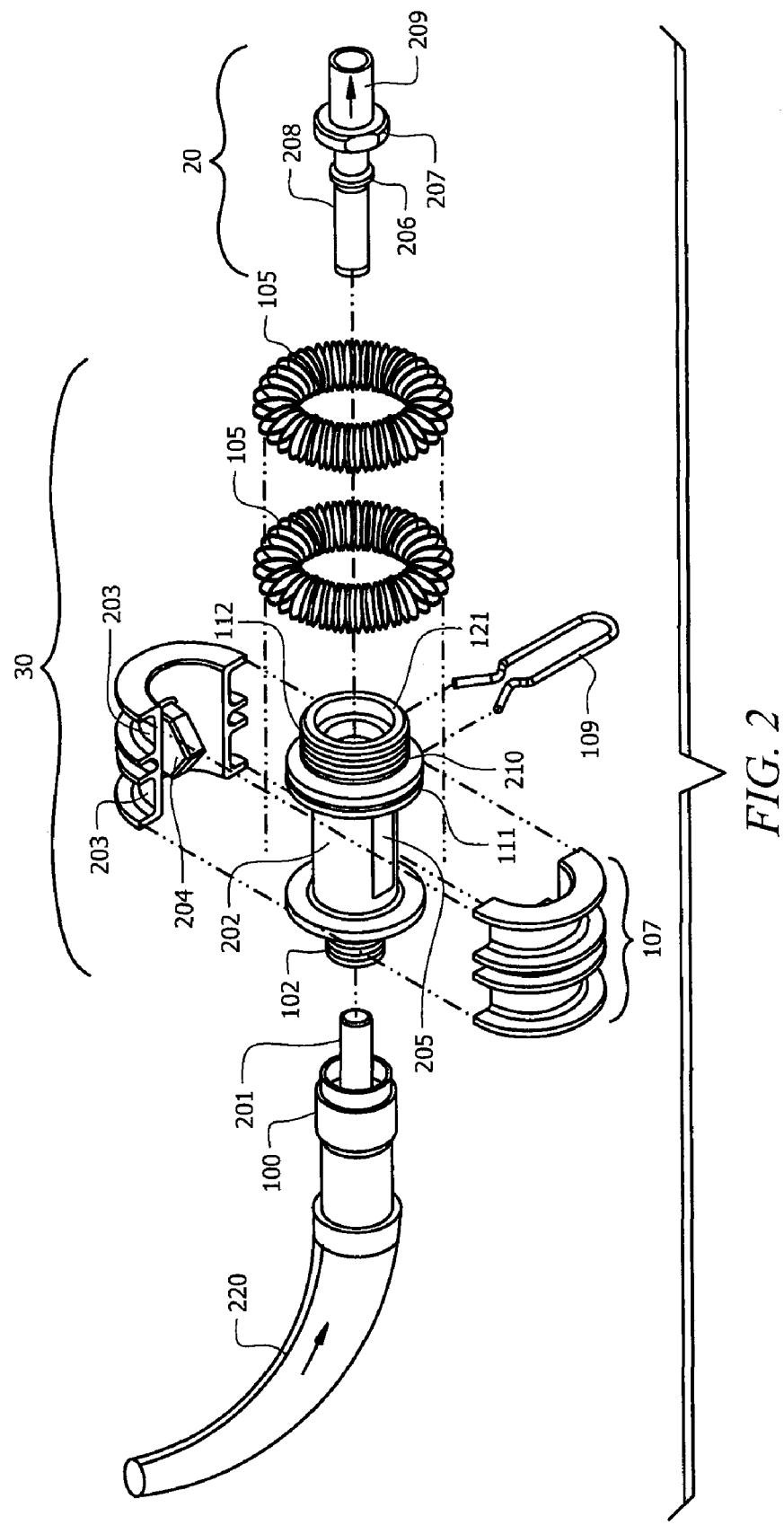
FIG. 2 is an exploded view of the embodiment shown in FIG. 1.

FIG. 2 shows an exploded view of the embodiment of the invention as shown in FIG. 1. FIG. 2 illustrates how downstream (often disposable and attached only semi-permanently for easy connection and removability) connector 20 mates with optical device 100 via coupling 30. Connector 20 has optical transmission path 209, flange 207, ridge 206 and ferrule 208. Transmission path 209 can be, for example, either single mode fibers or multi-mode fibers or any other transmission medium. In this embodiment, the end of ferrule 208 is positioned essentially flush with tip 201 of optical device 100 when connectors 20 and 100 are both properly positioned within coupling 30. Optical device 100 is threaded onto coupling 30 via threads 102. Note that the present invention is applicable for connecting any types of optical devices together safely.

In the embodiment shown in FIGS. 1 and 2, coupling 30 is generally comprised of coupling body 202, split shutter 107, garter springs 105, and retention clip 109. Elastic garter springs 105 are seated over split shutter 107 to hold them in place around coupling body 202. Split shutter 107 is mounted to coupling body 202 so that shutter gates 204 fit through slot 205 in body 202 and block any light emanating from end 201 from transmission through coupling 30 even though optical transmission is occurring into coupling 30 via optical device 100 from the optical source. It is noted that while some embodiments of the invention utilize slots (e.g., slots 205) that are located on the sides of the coupling, which may allow at least some light to escape from the coupling, the primary danger to eyesight is the direct beam transmitted from the source that would beam directly out of the device panel, for example, until such time as the ferrule is inserted into the coupling. The present invention obviates this danger to eyesight. Also, in the embodiment shown, the body of coupling 30 is within a housing such that the only optical transmission that is of concern is optical transmission from coupling end 121.

When it is desired to connect optical device 20 to optical device 100, ferrule 208 of connector 20 is inserted into end 121 of coupling body 202 of coupling 30 to a point where ferrule flange 207 is properly seated within coupling body 202 such that ridge 206 is inward (toward proximal end) of slot 210 and retention clip 109. Retention clip 109 serves to provide tactile sensing and, if desired, sound sensing, for the user indicating that connector 20 is properly seated within coupling 30. Clip 109 provides a pull-out force of approximately one pound to prevent connector 20 from being inadvertently withdrawn. Chip 109 makes a simple temporary connection and any suitable mechanism can be substituted therefor.

Figure 3:
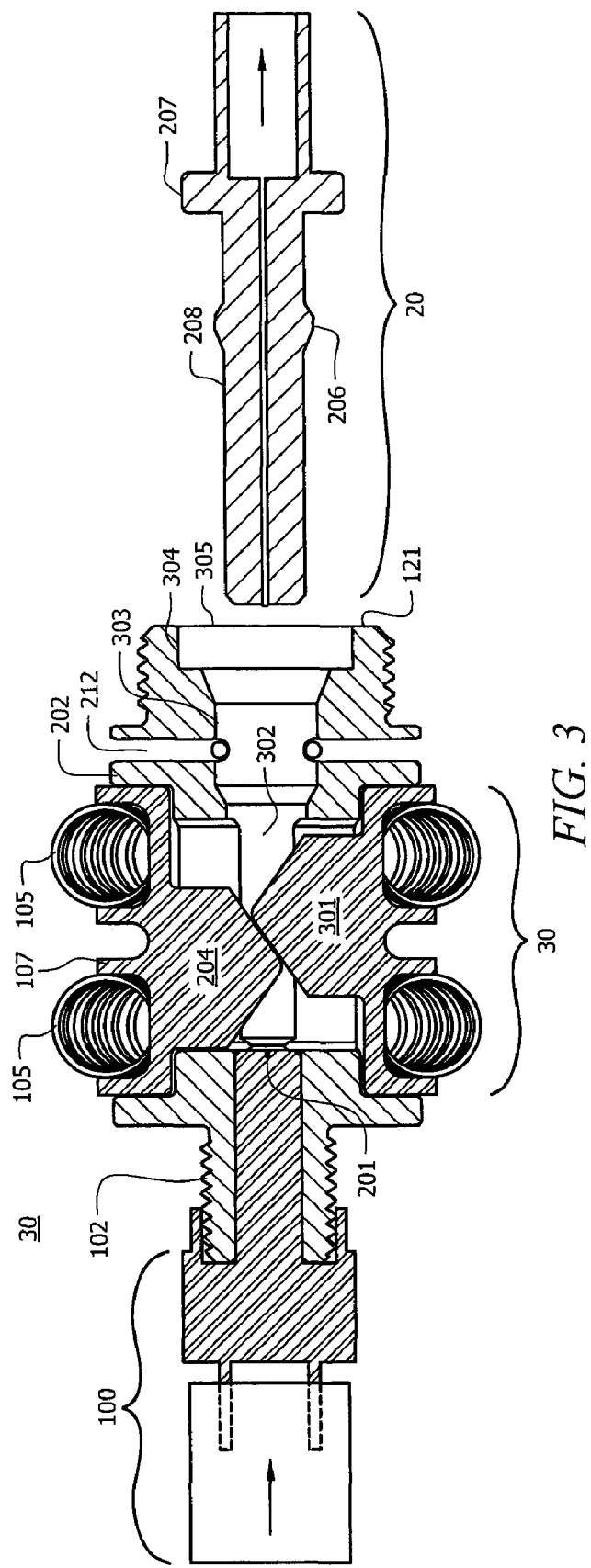
FIG. 3 is a cross-sectional view of the embodiment shown in FIG. 1.

The operation of this embodiment is described with reference to the cross-sectional view FIG. 3 of coupling 30. In FIG. 3, optical device 100, which is the source of the light in this embodiment, is attached to coupling 30. The two sections of split shutter 107 are identical in design and are reversed in their orientation around coupling body 202 so that shutter gates 204 and 301 make physical contact with each other when split shutter 107 is properly seated around coupling body 202, thereby preventing damaging light from device 100 from traveling through light canal 302 formed within coupling body 202. When ferrule 208 is inserted into distal end 121 of coupling 30, it travels through mouth 305 of ferrule seat 304, passes through canal 303, and through light canal 302 until it makes contact (or near contact) with end 201 of optical device 100. The diameter of ridge 206 prevents ridge 206 from moving into light canal 302 because of the reduced diameter of canal 302 over the diameter of canal 303.

When ferrule 208 first comes into contact with shutter gate 301 it gradually forces gate 301 and split shutter 107 radially outward (perpendicular) from the centerline of coupling body 202. This is made possible due to the elasticity of garter springs 105. This operation moves gate 301 out of light canal 302 and begins to open the light canal to optic transmission. However, until both gates 204 and 301 are open, such transmission is blocked. Note that while the second gate is mostly open prior to full engagement (when the device is substantially engaged) of device 20, the body of device 20 will block damaging light from escaping. Garter springs 105 must be capable of radially expanding to increase their diameter so that ferrule 208 can be inserted further into coupling body 202 to eventually force shutter gate 204 to open. Garter springs 105 may be metallic or non-metallic. It should be noted that flexible bands can be used to perform the same function instead of, or in addition to, the garter springs. Such bands can be polymeric in nature (e.g., rubber, silicone, etc.), but any material with elastomeric properties may be used.

As discussed, ferrule 208 gradually forces gate 301 to translate outward and eventually the ferrule comes into contact with gate 204 and gradually forces shutter gate 204 of split shutter 107 out of canal 302 allowing ferrule 208 to become positioned near end 201 of device 100. This allows the optical path from device 100 to be complete to device 20, thereby completing the coupling process.

Once ferrule 208 is properly seated within coupling 30, retention clip 109 (as discussed above) provides a tactile sense to a user of proper seating and also requires an extraction force to be applied to remove device 20.

Retention clip 109 may be of any configuration that acts to provide a positive quick-disconnect for mating ferrule 208 to coupling 30. Embodiments of the present invention also use alternate methods for securing ferrule 208 to coupling 30, such as spring connector designs in which ferrule 208 snaps or locks into place once it is seated properly. As ferrule 208 is being withdrawn from light canal 302, shutter gate 204 gradually descends back into light canal 302 as split shutter 107 is pushed back toward coupling body 202 by virtue of garter springs 105 which provide sufficient force to cause the shutters (gates) to close as device 20 is being withdrawn. This operation is a result of the fact that ferrule 208 is no longer pushing gate 204 out of light canal 302. As ferrule 208 continues to be withdrawn from light canal 302, gate 301 also gradually descends back into light canal 302 as split shutter 107 is pushed back toward coupling body 202 by virtue of garter springs 105. Prior to the point where the ferrule is completely removed from light canal 302 and even though device 20 is still at least partially inserted into coupling 30, gates 204 and 301 are both back in the closed state in which they prevent damaging light from being transmitted through light canal 302. The fact that the gates are split means that one of the gates (in this case, the gate closest to the light source) will fully close before the second gate is closed. Note also that the gates will both be closed before ferrule 208 is removed from light canal 302. This insures that at least one gate is closed before connector 20 is fully disengaged.

Because the invention prevents exposure of system users to what could be otherwise be damaging light, the invention in effect eliminates the need to power down the light source or use protective gear when coupling optical devices together since the level of light escaping the claimed coupling is reduced to non-damaging levels (e.g., levels that are inherently safe, levels that do not require the use of protective gear, levels that do not require the implementation of protective measures to prevent light from damaging eyesight, etc.). Note that the fiber optic cable can be used directly in the connector but in practice a ferrule connector can be used as discussed herein.

Figure 4:
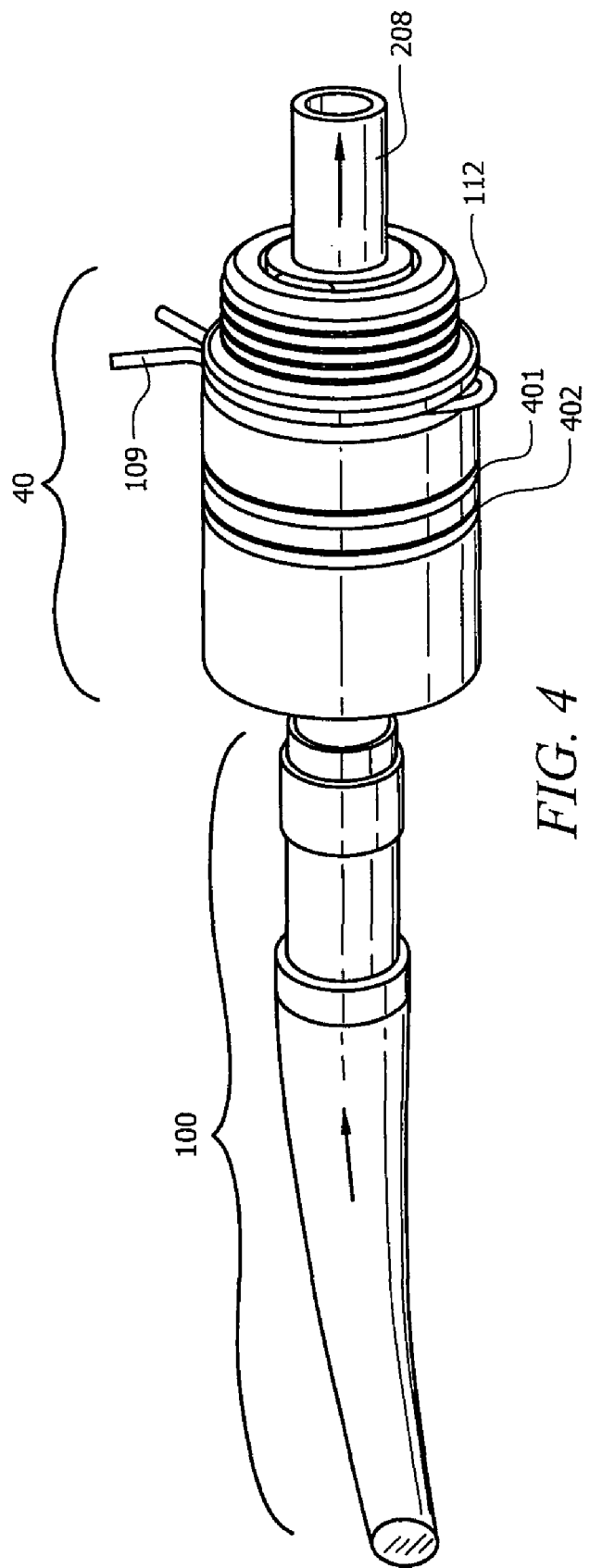
FIG. 4 is a perspective view of an embodiment that utilizes tabbed coupling inserts that flex out of the light path to prevent damaging light from being transmitted outside of the coupling body.

FIG. 4 is a perspective view of an embodiment of the present invention that utilizes tabbed coupling inserts that flex out of the light path to prevent damaging light from being transmitted outside of the coupling body. As with other embodiments, FIG. 4 shows incoming optical device 100 as a fiber optic connector, which provides the light source to the system. Also utilized in this embodiment are the components of retention clip 109 used to provide tactile sense by the user to ferrule 208. In this embodiment of the present invention, gates 401 and 402 prevent damaging light from being transmitted outside coupling 40.

Figure 5:
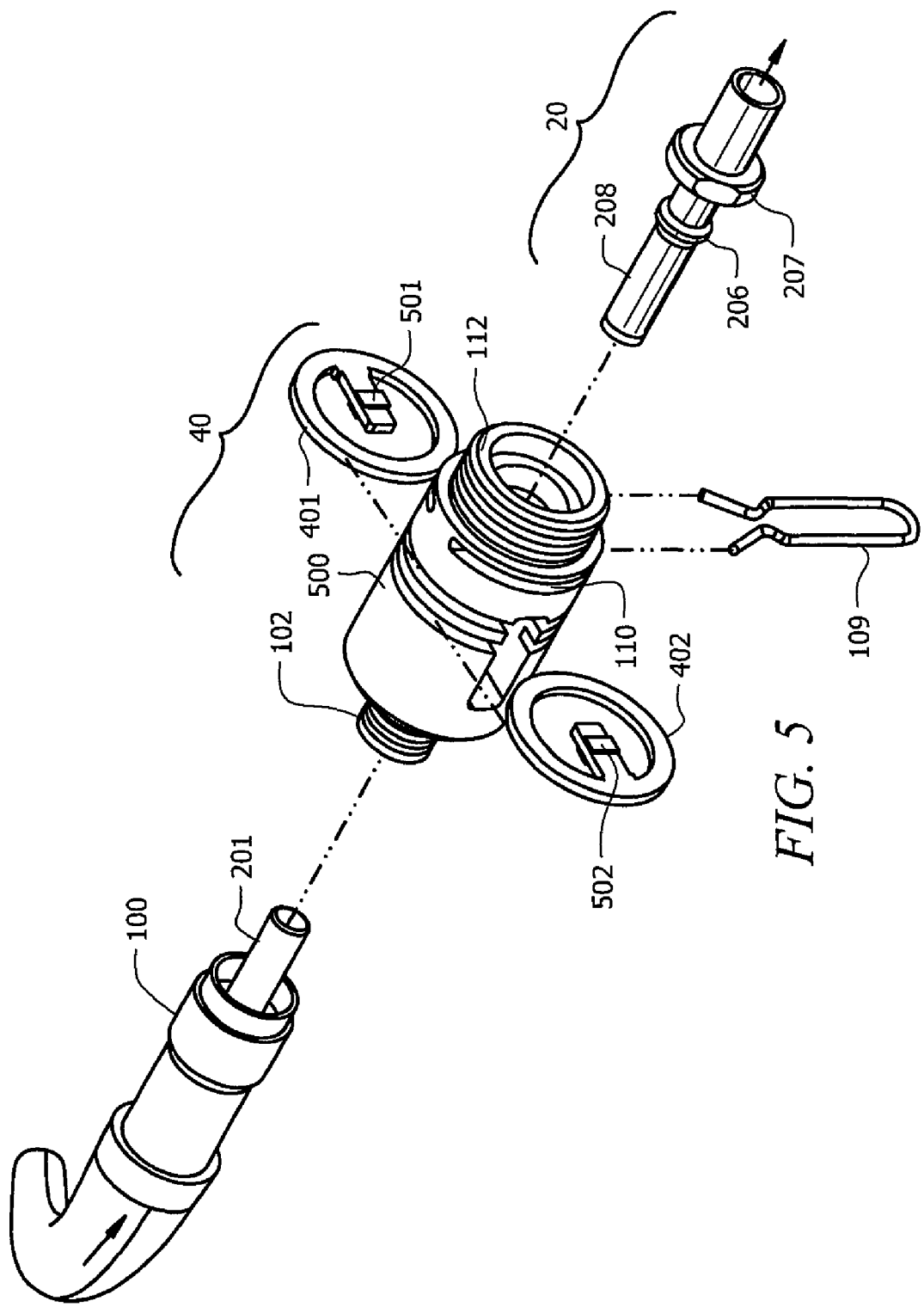
FIG. 5 is an exploded view of the embodiment shown in FIG. 4.

FIG. 5 is an exploded view of the embodiment of FIG. 4 that uses gated inserts to prevent light from being transmitted outside coupling 40 when device 20 is not connected. Coupling 40 is comprised of coupling body 500, gates 401 and 402, and retention clip 109. Gates 401 and 402 are positioned in this embodiment linearly along the length of coupling body 500, which provides for complimentary and incremental redundancy of the system. Ferrule 208 of device 20 is inserted into coupling body 500 and snapped into place when ferrule flange 207 is properly seated within coupling body 500.

In the embodiment shown in FIG. 5, gate 402 is positioned in coupling body 500 and supports gate 502, which when closed prevents damaging light (defined herein as light that can cause damage to a human) from traveling through the light canal of coupling body 500. Similarly, gates 401 is also positioned in coupling body 500 supporting gate 501 which when closed also prevents damaging light from traveling through the light canal of coupling body 500. Gates 501 and 502 are flexible and may be made of any material with elastomeric qualities that allow them to move out of the optic transmission path when device 20 is inserted in coupling 40 and to spring back into their formed configurations when device 20 is withdrawn from coupling 40.

When ferrule 208 is inserted into the light canal, gates 501 and 502 are sequentially rotated outward from the light canal and toward the sides of coupling body 500. As ferrule 208 is being withdrawn from the light canal within coupling body 500, gates 502 and 501 return sequentially to their original positions within the light canal where they prevent damaging light from being transmitted outside coupling 40. Note that both gates are in the closed (perpendicular to body 500) position before device 20 is fully removed from coupling 40.

Figure 6:
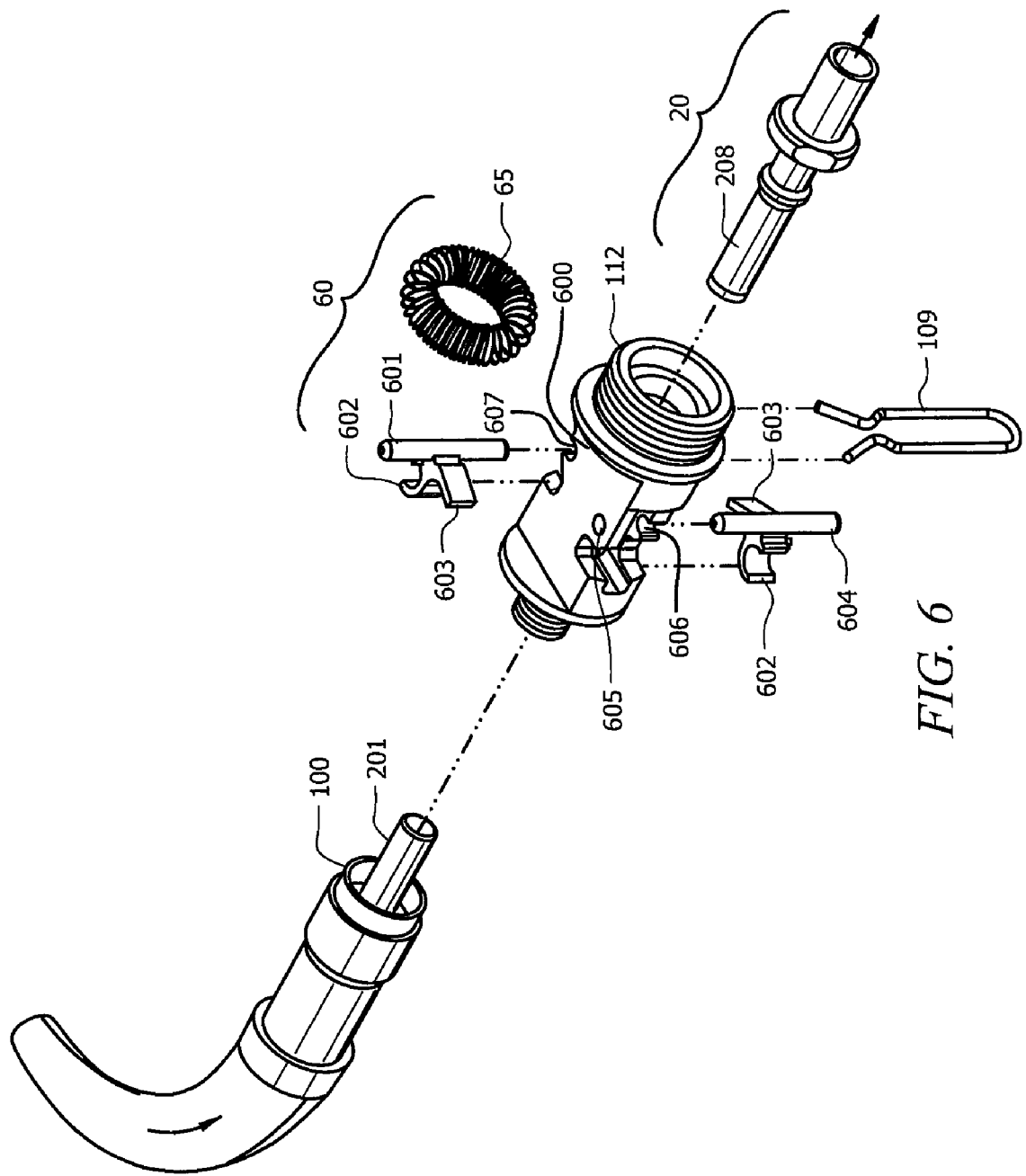
FIGS. 6 and 6A show exploded and sectional views of the embodiment that utilizes tabbed post coupling inserts that rotate out of the light path to prevent damaging light from being transmitted outside of the coupling body.

FIG. 6 shows an embodiment of the present invention that utilizes tabbed post coupling inserts that rotate out of the light path to prevent damaging light from being transmitted outside of the coupling body. The system shown in FIG. 6 again shows incoming optical device 100 as a fiber optic connector connected to coupling 60, which is generally comprised of coupling body 600, gate posts 601 and 604, garter spring 65, and retention clip 109. Optical device 20 is inserted into coupling body 600 and snapped into a quick-disconnect relationship with the connector, as discussed above.

Figure 6A:
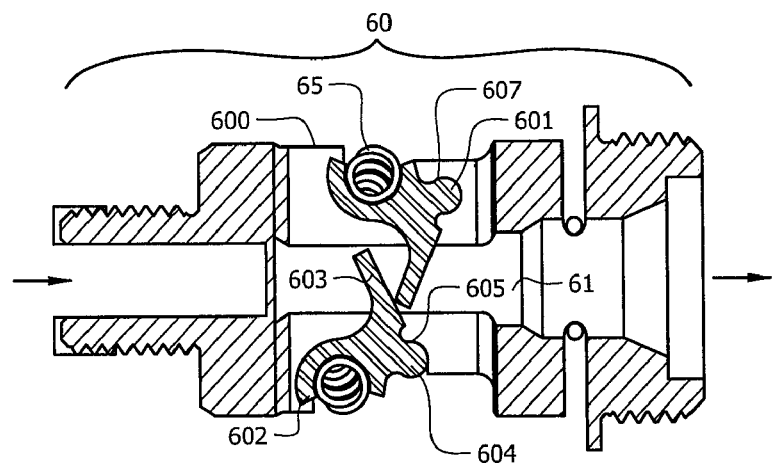

FIG. 6A shows a cross-section view of the embodiment shown in FIG. 6, in which identical gate posts 601 and 604 are mounted into the coupling body in a staggered arrangement in which gate post 604 is mounted in hole 605 and gate post 601 is mounted in hole 607 in a staggered and inverted configuration compared to the mounting of gate post 604. This configuration, as do all of the embodiments discussed herein, provides for a complimentary and redundant system in which no single point of failure results in damaging light escaping from the coupling. Gates 603 on posts 601 and 604 prevent damaging light from traveling through light canal 61 of coupling body 600. Prior to an optical device being inserted into coupling body 600, gates 603 prevent light from being transmitted outside of coupling body 600 by blocking the light canal of coupling 60, i.e. being positioned perpendicular to body 600 within the light canal. Gates 603 extend into the light canal under control of garter spring(s) 65 mounted around coupling body 600 so that it engages groove 602 of tabbed post coupling inserts 601 and 604. This operation causes gates to be positioned inside of the light canal to provide a system for preventing damaging light from being transmitted outside of coupling 60, except when an optical device is fully engaged within coupling 60.

When the optical device is inserted into the light canal, gates 603 are rotated outward out of the light canal and move toward the sides of coupling body 600 by the ferrule of the optical device. As the optical device ferrule is being withdrawn from the light canal, the spring action of garter spring 65 acting on grooves 602 rotate gates 603 back into position within the light canal where they prevent damaging light from being transmitted outside coupling 60.

Figure 7:
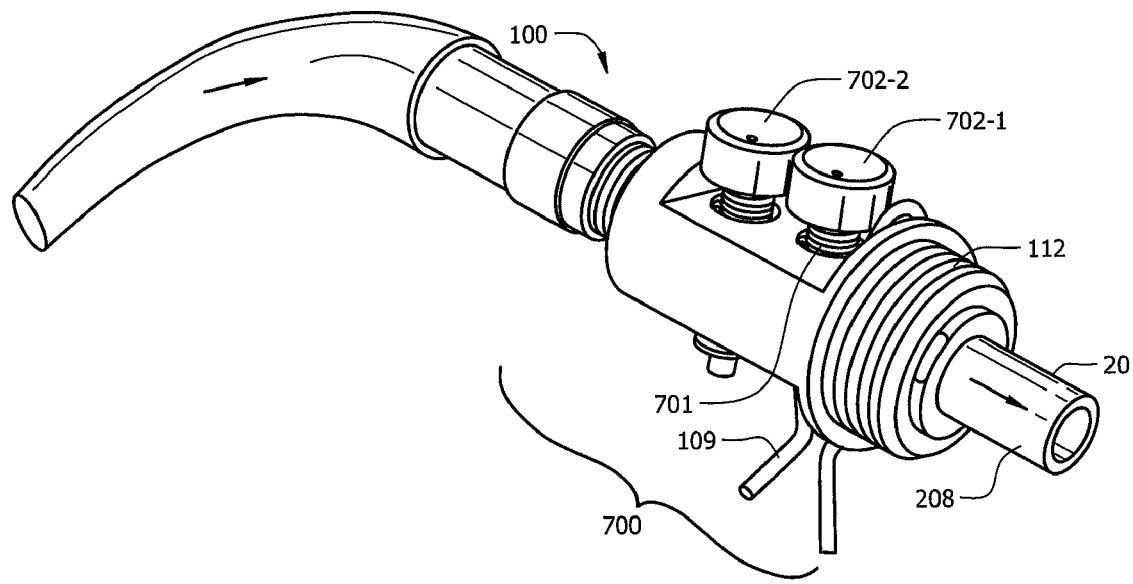
FIGS. 7 and 7A show embodiments that utilizes torsion spring gated pins that rotate out of the light path to prevent damaging light from being transmitted outside of the coupling body.
Figure 7A:
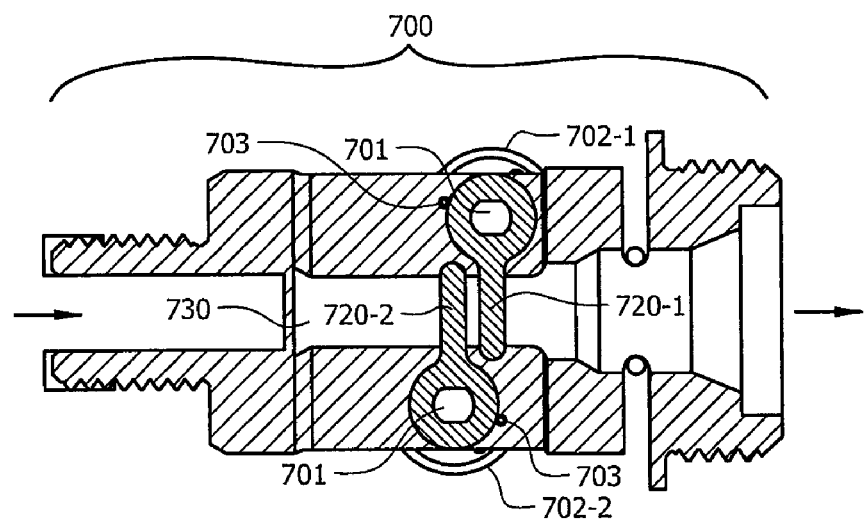

FIG. 7 is perspective view of an embodiment 700 of the present invention that utilizes torsion spring gated pins 702-1 and 702-2 that rotate out of the light path to prevent damaging light from being transmitted outside of the coupling body. In one version of this embodiment as seen in FIG. 7A, spring-wound gated pins 701 are inserted into staggered holes through the body of the coupling. The pins are linearly positioned along coupling body 700, and wound with a tension spring (not shown) that acts to allow the rotation of spring-wound pin 701 to a position in which gate tabs 720-1 and 720-2 extend into light canal 730 when the ferrule is not inserted. When the ferrule is inserted into the coupling, the ferrule pushes gate tabs 720-1 and 720-2 outward toward the sides of coupling body 700 causing the spring-wound pins to rotate against force exerted by the torsion springs 703. When the ferrule is removed, the torsion spring forces the pins to return to their natural position in which the gated tabs block the light canal thereby preventing damaging light from being transmitted out of coupling 700.

Figure 8:
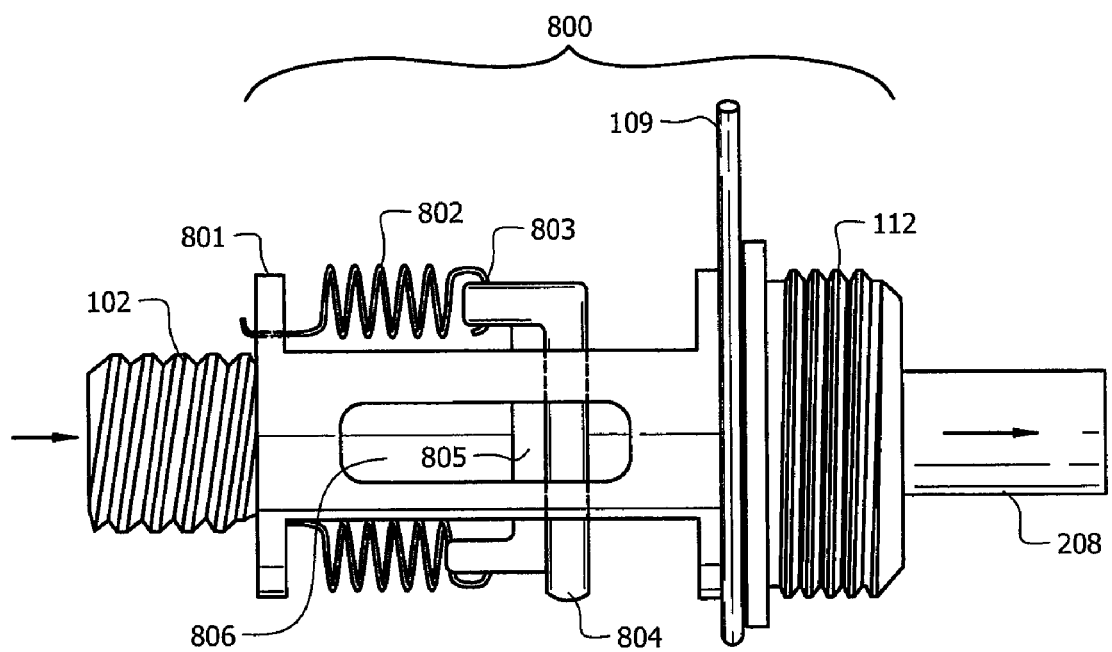
FIG. 8 shows one embodiment of an optical coupling having longitudinal springs controlling the gates that prevents damaging light from being transmitted outside of the coupling body.

FIG. 8 shows embodiment 800 of the present invention that utilizes linear springs 802 to rotate gate 805 into light path 806 to prevent damaging light from being transmitted outside of the coupling body when an output optic device is not connected. Gate 805 rotates with pin 804 (which in turn rotates within slots (not shown) in housing 801. Gate 805 is shown in the open position, as though a downstream connector (not shown) were connected to coupling 800. Any configuration of rotation is possible and a plurality of such gates would advantageously be used in a coupling. When an output optic device is inserted into coupling 800, its ferrule pushes against gates 804 to cause the gate to rotate outward toward the sides of coupling body 800 causing the spring-based gates to rotate. When the ferrule is removed, the springs force the gates to return to their resting (closed) positions in which the gates block the light canal of coupling body 800, thereby preventing damaging light from being transmitted out of coupling 800.

Figure 9:
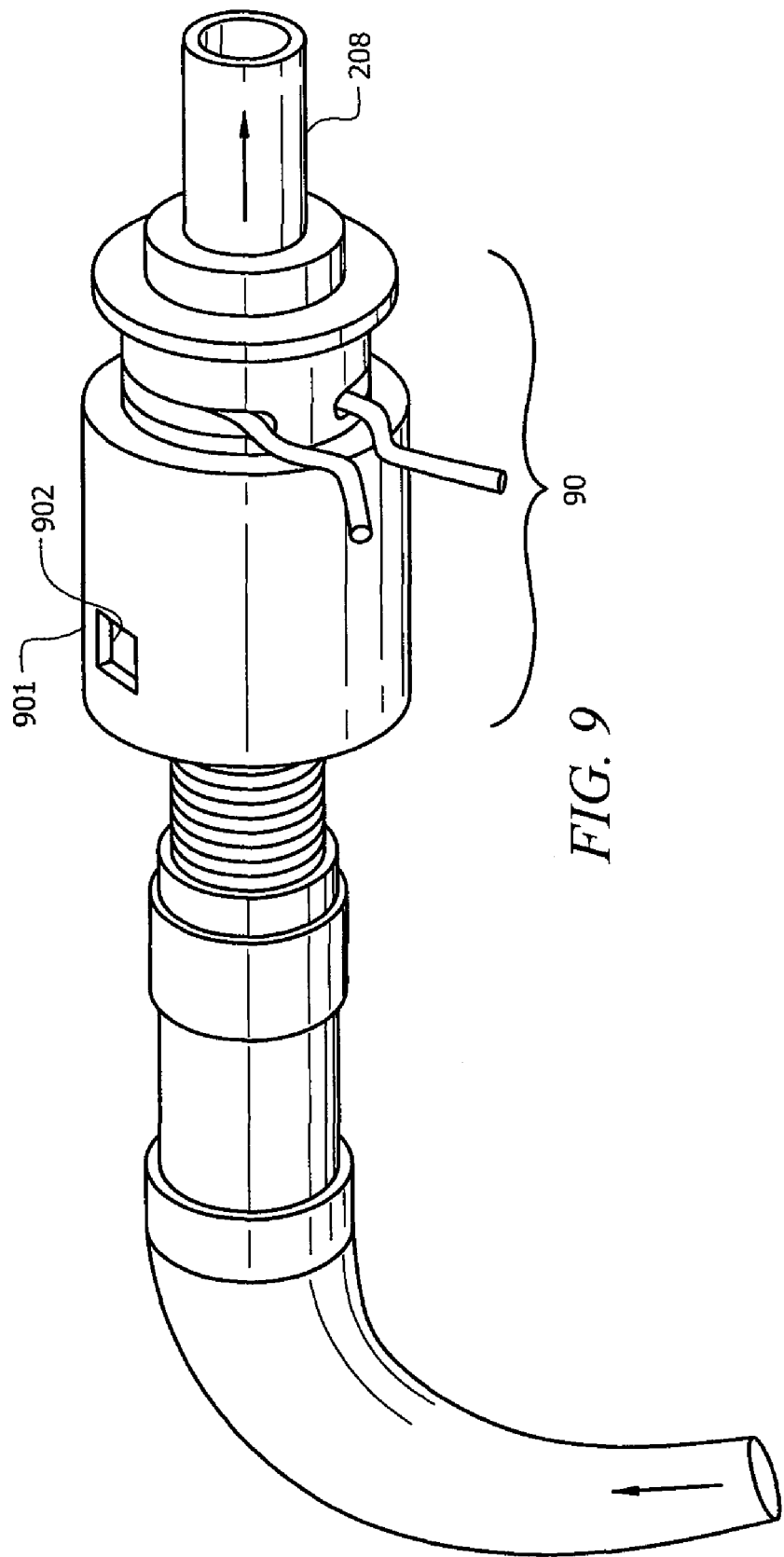
FIGS. 9 and 9A show views of an embodiment that utilizes a elastomeric housing for supplying the force for controlling the flexing of gates that prevent damaging light from being transmitted outside of the coupling body.
Figure 9A:
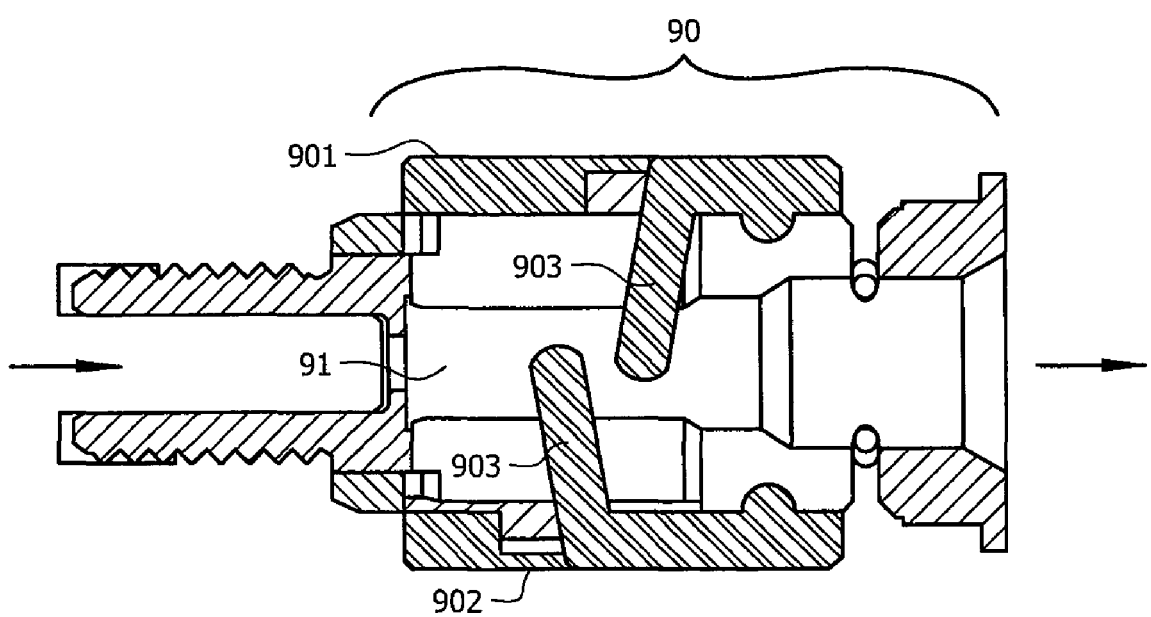

FIGS. 9 and 9A show views of an embodiment 90 that utilizes elastomeric housing 901 for supplying the force for controlling the flexing of gates that prevent damaging light from being transmitted outside of the coupling body. Window 902 is used to allow the housing to be molded and to form gates within the housing body for selectively blocking light from being transmitted through the light canal of the coupling at the wrong time.

FIG. 9A shows light canal 91 having gates 903 positioned therein. Gates 903 are elastomeric and, if desired, can be formed as part of housing 901 as above-discussed. Gates 903 function in the same manner as do the gates in the other embodiments in that when a downstream optical connector is inserted in the distal end of the coupling the ferrule on the inserted optical device pushes open the optic canal by causing the gates to flex outward. Note that the ends of the gates do not necessarily have to touch the sides of the optic canal since the damaging light from many types of sources is concentrated in the center of the canal.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical coupling comprising:
   a body having an input for allowing a first optical device to become semi-permanently attached thereto, said optical device transmitting potentially damaging optical transmission;
   said body having an output for allowing a second optical device to be inserted therein and quick-attached thereto;
   means for allowing said damaging optical transmission to pass from said first optical device to said second optical device when both of said optical devices are attached to said body; and
   means for preventing damaging optical transmission from escaping said body when said first optical device is attached to said body and said second optical device is detached from said body, and withdrawn either partially or fully from said body even though said damaging optical transmission is being transmitted into said body from said first optical device, wherein said preventing means comprises sequentially operating optics blocking gates, and wherein said gates comprise means for allowing each said gate to be moved non-rotationally out of an optics transmission path through said body only when said second optical device is properly positioned within said body.

2. The coupling of claim 1 wherein said preventing means allows said second optical device to become attached to said body while preventing damaging optical transmission from escaping said body all while said damaging optical transmission is being transmitted through said first optical device into said body.

3. The coupling of claim 1 wherein said gates are longitudinally positioned along a length of said body and operable for non-rotational movement under force provided by said second optical device engaging each said gate in sequence.

4. The coupling of claim 1 wherein said gates comprise:
a pair of structurally identical gates positioned within said coupling opposing each other relative to a direction of said non-rotational movement.

5. The coupling of claim 1 wherein said gates comprise:
means for allowing each said gate to be flexed out of an optical transmission path through said body only when said second optical device is properly positioned within said body.

6. An optical transmission coupling comprising:
a coupling body for allowing a first optical device to be coupled to a second optical device; and
at least one non-rotationally operating gate for preventing said first optical device from transmitting damaging light outside of said coupling body until said second optical device is properly positioned into said coupling body.

7. The coupling of claim 6 wherein said gate blocks light transmission through said coupling at all times when said second optical device is not at least partially within said coupling.

8. The coupling of claim 6 wherein said at least one gate comprises a sequentially operable plurality of gates positioned with said coupling body.

9. The coupling of claim 8 wherein said plurality of gates comprise:
a pair of structurally identical gates positioned within said coupling opposing each other relative to the non-rotational operation of said at least one non-rotationally operating gate.

10. The coupling of claim 8 wherein said first optical device is a fiber optic cable connected to an optic source and wherein said second optical device is a fiber optic cable.

11. The coupling of claim 8 further comprising:
at least one spring positioned with respect to said body to maintain each of said plurality of gates in a closed position when said second optical device is not in physical contact with each of said plurality of gates within said body.

12. The coupling of claim 11 wherein said at least one spring is a garter spring positioned around an outside of said body.

13. The coupling of claim 8 further comprising:
a tactile mechanism operable for preventing said second optical device from inadvertently becoming disconnected from said body.

14. A method for allowing a first optics device having damaging laser transmission therein to be coupled safely to a second optics device without requiring the use of protective devices to prevent human tissue damage, said method comprising:
positioning at a distal end of said first optics device a coupling having a light canal there through;
allowing a plurality of gates within said coupling to block damaging light from exiting said coupling until such time that said second optics device is at least substantially properly positioned within said coupling, wherein said gates comprise a pair of structurally identical gates positioned within said coupling opposing each other; and
inserting said second optics device into said coupling such that said gates are sequentially and non-rotationally moved out of said light canal.

15. The method of claim 14 further comprising:
providing a tactile sense to a user when said second optics device is properly positioned, said tactile sense operable for reducing a likelihood of said second optics device from inadvertently becoming removed from said coupling.

16. The method of claim 15 wherein said allowing comprises:
moving said gates out of said light canal under force from said inserting.

17. A system for use in medical procedures, said system comprising:
a source of human tissue damaging optical energy;
a supply line for delivering said optical energy to an outlet at a work site;
a coupling positioned at said supply line outlet for preventing said optical energy from escaping from said outlet until a downstream optical device has been properly positioned within said coupling, said coupling containing internal gates, each gate of said internal gates opened in a non-rotational direction by physical contact from a proximal end of said downstream optical device within said coupling; and
at least one elastomeric mechanism for closing each of said internal gates when said downstream optical device is no longer in physical contact therewith, wherein said elastomeric mechanism is circumferential to said coupling.

18. The system of claim 17 wherein said gates are longitudinally located within said coupling along an axis of movement of said optical device.

19. The system of claim 17 wherein said mechanism is integral with a body of said coupling.

20. The system of claim 17 wherein said gates comprise:
a pair of structurally identical gates positioned within said coupling opposing each other.

21. An optical coupling comprising:
a body having an input adapted to allow a first optical device to become semi-permanently attached thereto, said optical device transmitting potentially damaging optical transmission;
said body having an output adapted to allow a second optical device to be inserted therein and quick-attached thereto;
means for allowing said damaging optical transmission to pass from said first optical device to said second optical device when both of said optical devices are attached to said body; and
means for preventing damaging optical transmission from escaping said body when said first optical device is attached to said body and said second optical device is detached from said body, and withdrawn either partially or fully from said body even though said damaging optical transmission is being transmitted into said body from said first optical device,
wherein said preventing means comprises sequentially operating optics blocking gates, and wherein said gates are longitudinally positioned along a length of said body and operable for non-rotational movement under force provided by said second optical device engaging each of said gates in sequence.

22. The coupling of claim 21 wherein said preventing means allows said second optical device to become attached to said body while preventing damaging optical transmission to escape from said body all while said damaging optical transmission is being transmitted through said first optical device into said body.

23. An optical coupling comprising:
- a body having an input adapted to allow a first optical device to become semi-permanently attached thereto, said optical device transmitting potentially damaging optical transmission;
- said body having an output adapted to allow a second optical device to be inserted therein and quick-attached thereto;
- means for allowing said damaging optical transmission to pass from said first optical device to said second optical device when both of said optical devices are attached to said body; and
- means for preventing damaging optical transmission to escape from said body when said first optical device is attached to said body and said second optical device is detached from said body, and withdrawn either partially or fully from said body even though said damaging optical transmission is being transmitted into said body from said first optical device, wherein said preventing means comprises sequentially operating optics blocking gates operational for non-rotational movement, and wherein said gates comprise: a pair of structurally identical gates positioned within said coupling opposing each other.

24. The coupling of claim 23 wherein said preventing means allows said second optical device to become attached to said body while preventing damaging optical transmission to escape from said body all while said damaging optical transmission is being transmitted through said first optical device into said body.

* * * * *